United States Patent Office 3,509,212
Patented Apr. 28, 1970

3,509,212
OXYGENATED CYCLOALKYL ACYLAMIDES
Gunther S. Fonken and Milton E. Herr, Kalamazoo, and Herbert C. Murray, Barry Township, Barry County, Mich., assignors to The Upjohn Company, Kalamazoo, Mich., a corporation of Delaware
No Drawing. Original application Mar. 20, 1964, Ser. No. 353,581. Divided and this application Dec. 5, 1966, Ser. No. 598,902
Int. Cl. C07c $103/38$
U.S. Cl. 260—561                    7 Claims

ABSTRACT OF THE DISCLOSURE

Novel and useful oxygenated cycloalkyl acylamides of the formula:

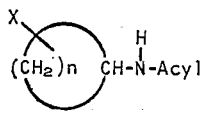

wherein $n$ is a whole number from 9 to 14, inclusive, X is hydroxy or keto and Acyl is the acyl radical of a hydrocarbon carboxylic acid of from 1 to 12 carbon atoms, inclusive, which are useful inter alia as biocides, insect repellants, plasticizers, cross-linking agents, pharmacologic agents and as intermediates.

---

This application is a division of application Ser. No. 353,581, filed Mar. 20, 1964, and now abandoned.

This invention relates to a novel method for the introduction of oxygen into the cycloalkane ring of N-acyl derivatives of cycloalkylamines.

More particularly, this invention relates to the introduction of oxygen into the cycloalkane ring of N-acyl derivatives of cycloalkylamines by subjecting them to the oxygenating activity of microorganisms of Subphylum 2 of Phylum III, hereinafter identified, to the novel products produced by the process of this invention and to derivatives thereof.

The novel process and products of this invention are represented by the following reaction scheme:

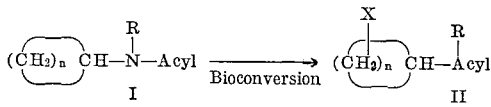

wherein $n$ is a whole number from 4 to 14, inclusive, R is selected from the group consisting of hydrogen and a cycloalkyl radical, containing from 5 to 15 carbon atoms, inclusive, Acyl is selected from the group consisting of the acyl radical of an organic monocarboxylic acid, preferably a monobasic hydrocarbon carboxylic acid containing from 1 to 12 carbon atoms, inclusive, for example, the monocarboxylic acids hereinafter listed as acylating agents, the group,

in which $R^1$ is an aralkyl substituent containing from 7 to 16 carbon atoms, inclusive, such as benzyl, p-nitrobenzyl, 4 - methylbenzyl, 3 - methylbenzyl, 4 - methylphenethyl, 4-biphenylbutyl, α-naphthylmethyl, β-naphthylethyl, and the like, and the group, —SO$_2$—R$^2$, in which R$^2$ is an aryl substituent containing from 6 to 12 carbon atoms, inclusive, such as, for example, phenyl, tolyl, xylyl, naphthyl, biphenylyl and the like; and X is selected from the group consisting of hydroxy and keto.

The novel compounds of this invention include those represented by Formula II, above, the acylates of the compounds of Formula II, wherein X is hydroxy and the functional derivatives of the compounds of Formula II wherein X is keto, for example, the cyclic alkylene ketals.

The novel compounds of this invention are useful as insecticides, fungicides, parasiticides, protein denaturants, insect repellants, high boiling solvents, plasticizers for synthetic resins, cross-linking agents for fiber synthesis, pharmacologic agents for psychic control effects and as intermediates for dyes, polymers and fibers.

As an example of their use as intermediates the compounds of Formula II, wherein X is keto (the hydroxy compounds can be oxidized to keto as hereinafter disclosed) can be converted to lactams which can be hydrolyzed to amino acids in accordance with the procedures disclosed in U.S. Patents 2,579,851 and 2,569,114. For example, the ketones (II) are converted to the oximes by reacting them with hydroxylamine or a salt thereof. The oximes are then subjected to a Beckman rearrangement by treatment with sulfuric acid or the equivalent to produce lactams. The lactams thus produced are useful intermediates giving on hydrolysis amino acids. The lactams and amino acids thus obtained are useful for the manufacture of valuable products, for example, polyamides, as disclosed in U.S. 2,579,851, supra.

For use as insect repellants the compounds of this invention can be formulated with aqueous or nonaqueous carriers in accordance with methods known in the art.

The microbiological process of this invention comprises subjecting an N-acyl derivative of a cycloalkylamine (I) to the oxygenating activity of a species of microorganism of Subphylum 2 of Phylum III, hereinafter identified, to produce the corresponding oxygenated compounds of Formula II.

The microorganisms employed in the process of this invention are those which are classified under the heading Subphylum 2 of Phylum III, which latter is commonly called Thallophyta. This system of classification is that commonly employed in the art and is set forth by Frobisher; Fundamentals of Microbiology, Sixth Edition, 1957, Saunders Company, Philadelphia at page 10. This aforesaid Subphylum 2 of Phylum III embraces five classes, namely, Phycomycetes, Ascomycetes, Basidiomycetes, Deuteromycetes (Fungi imperfecti) and Schizomycetes. Table I below sets forth representative genera and orders falling within these classes of microorganisms. While all species of microorganisms falling within the five classes of Subphylum 2 can be employed in the process of this invention, it is preferred to employ species of microorganism falling within the orders: Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonadales and Actinomycetales. Among the families of the above listed orders, it is preferred to employ in the practice of this invention species of microorganisms falling within the families Mucoraceae, Cunninghamellaceae, Eurotiaceae, Hysteriaceae, Nectreaceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae. Of the genera within the above listed families it is preferred to employ species of microorganisms of the genera: Absidia, Circinella, Gongronella, Rhizopus, Cunninghamella, Eurotium, Gloniopsis, Glonium, Hysterium, Mytilidion, Calonectria, Gibberella, Hypomyces, Dermatea, Cenangium, Adelopus, Chaetomium, Endothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichum, Trichothecium, Brachysporium, Cladosporium, Curvularia, Cylindrocarpon, Rhizoctonia, Pseudomonas, Mycobacterium, Micrococcus, Nocardia and Streptomyces.

TABLE I

Phycomycetes

Entomophthorale: Conidibolus, Delacroixia
Mucorales: Absidia, Blakeslea, Circinella, Chaetocladium, Cunninghamella, Helicostylum, Gongronella, Mucor, Parasitella, Phycomyces, Rhizopus
Saprolegniales: Achlya

Ascomycetes

Endomycetales: Ascocybe, Byssochlamys, Cephaloascus, Endomyces, Endomycopsis, Petasospora
Eurotiales: Ctenomyces, Carpenteles, Eidamella, Emericillopic, Eurotium, Microascus, Penicilliopsis, Talaromyces
Dothideales: Acrospermum, Capnodium, Chaetothyrum, Cymadothea, Dangeardiella, Dothidea, Rhopographus, Scorias
Helotiales: Allophylaria, Cenangium, Corynella, Dermea, Godronia, Pezizella
Hemisphaeriales: Schizothyrina, Schizothyrium
Hypocreales: Calonectria, Calotilbe, Claviceps, Cordyceps, Crenoectria, Epichloe, Gibberella, Hypocrea, Hypomyces, Loramyces, Melanospora, Nectria, Nectriella, Neocosmospora, Ophionectria, Sphaerostilbe
Hysteriales: Farowiella, Gloniella, Gloniopsis, Glonium Hysterium, Lophium, Mytilidion, Ostreion
Myriangiales: Dothiora, Elsinoe
Pezizales: Ascobolus, Discomycetella, Morchella, Patella, Pyronema, Sowerbyella, Wolfina
Phacidiales: Coccopeziza, Colpoma, Clithris, Phacidiella, Phacidium, Sphaerothyrium
Sphaeriales: Adelopus, Chaetomium, Chaetomidium, Clathrospora, Didymella, Endothia, Glomerella, Guignardia, Mycosphaerella, Physalospora, Xylaria, Subbaromyces
Taphrinales: Protomyces, Taphridium Taphrina

Basidiomycetes

Agaricales: Aleurodiscus, Alnicola, Boletus, Clavaria, Coprinus, Clitocybe, Collybia, Coniophora, Corticum, Deconica, Entaloma, Fomes, Hygrophorus, Lentinellus, Lentinus, Panaeolus, Paxillus, Peniophora, Pholiota, Pleurotus, Plicatura, Polyporus, Poria, Psalliota, Schizophyllum, Sparassis, Stereum, Tricholoma, Trametes
Lycoperdales: Bovista, Calvatia, Geastrum, Lycoperdon
Nidulariales: Crucibulum, Cyathus, Nidula, Sphaerobolus
Phallales: Mutinus, Phallus, Simblum
Sclerodermatales: Gastrosporium, Lycogalopsis, Phellorinia, Sphaerobolus, Tulostoma
Tremellales: Auricularia, Ceratobasidium, Calocera, Dacrymyces, Helicobasidium
Ustilaginales: Bryophytomyces, Cintractia, Entyloma, Farysia, Graphiola, Schizonella, Sorosporium, Tilletia, Tolyposporium, Urocystis, Ustilago

Deuteromycetes

Melanconiales: Actinonema, Allelchaeta, Colletotrichum, Cryptosporium, Entomoporium, Melanconium, Myxosporium, Pestalotia, Septomyxa, Steganosporium, Tuberculariella
Moniliales: Acremonium, Aspergillus, Botrytis, Brachysporium, Cladosporium, Curvularia, Cylindrium, Cylindrocarpon, Dactylium, Fusarium, Gliocladium, Helicodendron, Helicosporium, Helminthosporium, Keratinomyces, Pencillium, Sepedonium, Sporotrichum, Trichothecium
Mycelia Sterilia: Microxyphium, Papulospora, Rhizoctonia, Sclerotium
Sphaeropysidales: Ascochyta, Coniothyrium, Dendrophoma, Diplodia, Diplodina, Polyopeus, Sphaeropsis, Wojnowicia, Zythia

Schizomycetes

Actinomycetales: Micrococcus, Mycobacterium, Mycococcus, Nocardia, Streptomyces
Pseudomonadales: Pseudomonas, Mycoplana, Protaminobacter
Eubacteriales: Aerobacter, Arthrobacter, Bacillus, Corynebacterium Cultures of a large number of species, falling within the group of microorganisms which can be employed in the process of the invention, are available from known sources such as the Northern Utilization Research and Development Branch, U.S. Department of Agriculture, Peoria, Ill. (NRRL), the American Type Culture Collection (ATCC), Washington, D.C., and Centraalbureau voor Schimmelcultures (CBS), Baarn, Holland or as otherwise indicated. The species listed in Table II, together with Culture Collection numbers, are typical of those which are available from the above sources and are representative of those which can be employed in the process of the invention.

TABLE II

Phycomycetes

*Achlya americana*, ATCC 10977
*Achlya bisexualis*, ATCC 11397
*Achlya crenulata*, ATCC 11315, CBS
*Absidia cylindrospora*, ATCC 11516
*Absidia cylindrospora*, NRRL 2796
*Absidia cylindrospora*, var. rhizamorpha, NRRL 2815
*Absidia pseudocylindrospora*, NRRL 2770
*Absidia glauca*, ATCC 7852a, 7852b
*Circinella angarensis*, NRRL 2410
*Circinella angarensis*, NRRL 2628
*Circinella spinosa*, ATCC 9025, CBS
*Cunninghamella blakesleeana*, ATCC 8688a
*Cunninghamella baineri*, ATCC 6794b
*Gongronella bulteri*, CBS
*Gongronella ureceolifera*, CBS
*Gongronella lacrispora*, NRRL 2643
*Mucor griseocyanus*, ATCC 1207a
*Rhizopus arrhizus*, ATCC 11145
*Rhizopus nigricans*, ATCC 6227b

Ascomycetes

*Adelopus nudus*, CBS
*Cenangium abietis*, CBS
*Dermea balsama*, CBS
*Dermea libocedri*, CBS
*Eurotium echinulatum*, CBS
*Calonectria decora*, CBS
*Clithris quercina*, CBS
*Gibberella saubinettii*, CBS
*Hypomyces haematococcus*, CBS
*Chaetomium globosum*, ATCC 6205
*Gloniopsis brevisaccata*, CBS
*Glonium clavisporum*, CBS
*Glonium stellatum*, CBS
*Hysterium angustatum*, CBS
*Hysterium insidens*, CBS
*Mytilidion australe*, CBS
*Mytilidion hastenii*, CBS
*Mytilidion tortile*, CBS
*Endothia parasitica*, ATCC 9414
*Guignardia bidwelli*, ATCC 9559, 9560

Basidiomycetes

*Alnicola escharoides*, CBS
*Boletus luteus*, CBS
*Boletus sp*, Peck 168 (Ohio State Univ.)
*Coprinus narcoticus*, CBS
*Corticium sasakkii*, NRRL 2705
*Corticium microsclerotia*, NRRL 2727
*Clavaria stricta*, CBS
*Deconica atrorufa*, CBS

*Deconica coprophila,* CBS
*Cyathus poeppigii,* CBS
*Cyathus olla,* CBS
*Pleurotus passeckerianus,* ATCC 9416
*Pholiota adiposa,* ATCC 9393
*Poria ambigua,* ATCC 9408
*Sphaerobolus stellatus,* CBS Deuteromycetes

*Alternaria tenuis,* ATCC 6663
*Aspergillus nidulans,* ATCC 11267
*Aspergillus niger,* ATCC 9027
*Aspergillus niger,* ATCC 9142
*Aspergillus niger,* ATCC 10579
*Aspregillus niger,* ATCC 8740
*Aspergillus proliferans,* CBS
*Aspergillus ruber,* ATCC 9481
*Aspergillus versicolor,* ATCC 9577
*Brachysporium oryzae,* ATCC 11571, CBS
*Cladosporium resinae,* NRRL 2778
*Curvularia lunata,* ATCC 12017
*Curvularia pallescens,* ATCC 12017, NRRL 2381
*Cylindrium suaveolens,* CBS
*Cylindrocarpon didymum,* CBS
*Cylindrocarpon radicicola,* ATCC 11811
*Fusarium culmorum,* ATCC 12656
*Helicodendron tubulosum,* CBS, ATCC 7808
*Helicosporium lumbricopsis,* CBS
*Helicosporium phragmitis,* CBS
*Helminthosporium carbonum,* ATCC 9627
*Keratinomyces ajelloi,* CBS
*Penicillium atrovenetum,* CBS
*Penicillium aurantio-virens,* ATCC 10413, NRRL 2138
*Penicillium patulum,* ATCC 9260, 10120 NRRL 994
*Rhizoctonia solani,* ATCC 6221, 10154, 10157, 10159, 10163
*Sepedonium ampullosporum,* CBS
*Sporotrichum sulfurescens,* ATCC 7159
*Trichothecium roseum,* ATCC 8685, NRRL 1665
*Ascochyta linicola,* NRRL 2923, CBS
*Diplodia natalensis,* ATCC 9055
*Septomyxa affinis,* ATCC 6737
*Wojnowicia graminis,* CBS
*Zythia resinate,* CBS Schizomycetes

*Mycobacterium rhodochrous,* ATCC 999, 4273, 4276
*Micrococcus flavoroseus,* ATCC 397
*Micrococcus cerolyticus,* ATCC 12559
*Micrococcus cinnabareus,* ATCC 11890
*Micrococcus rubens,* ATCC 186
*Nocardia corallina,* CBS, ATCC 4273, 2161
*Nocardia erythropolis,* CBS, ATCC 4277
*Nocardia gardneri,* ATCC 9604
*Nocardia restrictus,* CBS
*Aerobacter aerogenes,* ATCC 8724
*Streptomyces roseochromogenus,* ATCC 3347
*Streptomyces argenteolus,* ATCC 11009
*Streptomyces olivaceus,* ATCC 12019
*Streptomyces mediocidicus,* ATCC 13279
*Streptomyces mediocidicus,* ATCC 13278
*Pseudomonas aeruginosa,* ATCC 8689
*Pseudomonas fluorescens,* ATCC 949
*Corynebacterium simplex,* ATCC 6946

The starting materials (I) for the process of this invention, some of which are known, are prepared from cycloalkylamines and dicycloalkylamines by methods known in the art for converting amines to amides and carbamates. The dicycloalkylamines are conveniently prepared in the form of their hydrochlorides by the "Leuckart Reduction" (Organic Reactions, Vol. 5, pages 301–330, John Wiley and Sons, Inc., New York, N.Y.) as disclosed in Preparation 2 herein. The N-cycloalkylamides and N,N-dicycloalkylamides of Formula I are prepared by reacting the selected cycloalkylamine or dicycloalkylamine with the anhydride or acid halide of a monobasic carboxylic acid, for example, those acids hereinafter named as acylating agents, or of a monobasic aryl sulfonic acid, such as for example, benzenesulfonic acid, o-, m-, and p-toluenesulfonic acids, $\alpha$ and $\beta$-naphthalene sulfonic acids, p-chlorobenzenesulfonic acid and the like, as illustrated by Preparations 1 and 3 through 6, herein. The aralkyl N-cycloalkylcarbamates and aralkyl, N,N-dicycloalkylcarbamates of Formula I are prepared by reacting the selected cycloalkylamine or dicycloalkylamine with the appropriate carbalkyloxy halide, such as, for example, carbobenzoxy chloride, as illustrated by Preparations 7 and 8, herein.

The operational conditions and reaction procedures of this invention are advantageously those known in the art of bioconversion as illustrated in Murray et al., U.S. Patents 2,602,769 and 2,735,800.

In the practice of this invention, the bioconversion can be effected by a growing or resting culture of the microorganism or by spores, washed cells or enzymes of the microorganism.

Culture of the selected species of microorganism for the purpose and practice of this invention is in or on a medium favorable to development of the microorganism. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as carbohydrates, e.g., glucose, fructose, sucrose, lactose, maltose, dextrines, starches; meat extracts, peptones, amino acids, proteins, fatty acids, glycerol, whey and the like. These materials may be used either in a purified state or as concentrates such as whey concentrate, corn steep liquor, grain mashes, and the like, or as mixtures of the above. Many of the above sources of carbon can also serve as a source of nitrogen.

The medium can desirably have a pH before inoculation of between about 4 to about 7 though a higher or lower pH can be used. A temperature between about 25 to 32° C. is preferred for growth of the microorganism but higher or lower temperatures within a relatively wide range are suitable.

The substate can be added to the culture during the growth period of the microorganism as a single feed or by gradual addition during the conversion period or it can be added to the medium before or after sterilization or inoculation making appropriate adjustments for effects of pH and/or temperature upon the stability of the substrate used. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism, for example, by dissolving the substrate, when it is a solid, in an organic solvent and mixing the solution thoroughly with the medium or by adding to the medium finely comminuted particles of the substrate, e.g., micronized particles, preferably 90% by weight smaller than 20 microns, either as a dry powder or, preferably for mechanical reasons, as an aqueous suspension. In preparing the aqueous suspension, the use of dispersing or suspending agents is advantageous.

The temperature during the fermentation can be the same as that found suitable for growth of the microorganism. It need be maintained only within such range as supports life, active growth or the enzyme activity of the microorganism; the range of 20 to 35° C. is preferred. A pH of about 4 to 6 is generally preferred for growth of the microorganism during the bioconversion but for acid-sensitive substrates, and for microorganisms of the class Schizomycetes, the pH should be about 7 during the fermentation. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography or thin-film chromatography [Heftman, Chromatography (1961) Reinhold Publishing Co., New York, N.Y.].

Alternatively, the oxygenation of the selected substrate can be effected under aerobic conditions by subjecting it to the oxygenating action of oxygenating enzymes isolated from the microorganism, to the action of spores of the microorganism, and to the action of isolated cells of the microorganism. Isolated enzyme preparations can be prepared in accordance with the general procedure disclosed by Zuidweg et al., Biochim. Biophys. Acta, 58, 131–133 (1962). Oxygenation can be effected with spores in accordance with the general process disclosed in U.S. Patents 3,031,379 and 3,031,382. The separation of washed cells from the fermentation medium is well known in the art, see for example U.S. Patent 2,831,789.

The term "oxygenating activity" as used throughout this specification means the enzymatic action of a growing or resting culture of the microorganism or of spores, washed cells or isolated enzymes of the microorganism, which effects introduction of oxygen in the molecule of the substrate, under aerobic fermentation conditions.

After completion of the fermentation, the resulting oxygenated products (II) are recovered from the fermentation beer by conventional methods. For example, the whole beer can be extracted with a water-immiscible organic solvent such as methylene chloride, chloroform, carbon tetrachloride, ethylene chloride, trichloroethylene, ether, amyl acetate, benzene, and the like or the beer and mycelia can be separated by conventional methods such as centrifugation or filtration, and then separately extracted with suitable solvents. The mycelia can be extracted with either water-miscible or water-immiscible solvents or in the cases where little or no product is contained in the mycelium, it can be merely washed with water and the wash water added to the beer filtrate. The beer, free of mycelia, can then be extracted with water immiscible solvents such as those listed above. The extracts are combined, dried over a drying agent such as anhydrous sodium sulfate, and the solvent removed by conventional methods such as evaporation or distillation at atmospheric or reduced pressure. The oxygenated products thus obtained can be further purified by conventional methods, e.g., recrystallization, chromatography, distillation in the case of liquids, and the like.

Separation of the various oxygenated products (II) obtained from the fermentation can be accomplished by conventional methods such as chromatography and/or fractional crystallization and, if liquids, by distillation. In certain instances when separation of the hydroxy compounds is difficult a convenient and advantageous method is first to oxidize under acidic neutral or slightly basic conditions the crude oxygenated N-cycloalkylamides or N,N-dicycloalkylamides obtained from the beer in accordance with methods known in the art for oxidizing secondary hydroxy groups to ketones, for example, Fieser and Fieser, Natural Products Related to Phenanthrene, 3rd ed., pages 127–129, 193 and 194, Reinhold Publishing Corporation, New York, N.Y. Thus, the crude bioconversion products of Formula II corresponding otherwise to the selected starting material are dissolved in an inert organic solvent such as acetone, benzene, methylene chloride, t-butanol, and the like, and then oxidized with aqueous chromic acid, potassium permanganate, t-butyl hypochlorite or like oxidizing agents to convert the secondary hydroxy groups present to keto, thereby producing a mixture of the corresponding keto compounds which are in some cases more easily separated by chromatography and/or crystallization or distillation in the case of liquids.

In certain instances the compounds of Formula II, wherein R is hydrogen and Acyl is the acetyl radical, can be obtained by the alternative process of subjecting the corresponding cycloalkylamine, e.g., those disclosed in Preparation 1, herein, to bioconversion with a species of Subphylum 2 of Phylum III. The bioconversion conditions and extraction procedures are the same as those disclosed above for the N-acyl derivatives cycloalkylamines.

The compounds of Formula II, wherein X is keto, can, if desired, be reduced, preferably under neutral or acidic conditions, in accordance with methods known in the art for reducing carbonyl groups to produce the corresponding hydroxy compounds. For example, reduction can be conveniently accomplished for example, with hydrogen in the presence of a catalyst such as palladium, platinum or Raney nickel under neutral conditions; sodium in an alkanol; or with a reducing agent such as lithium aluminum hydride, sodium borohydride, primary isobutyl magnesium bromide or lithium tritertiary butoxy aluminum hydride, and the like.

The compounds of Formula II wherein X is hydroxy can be acylated to give the corresponding acyloxy compound in accordance with methods known in the art for acylating secondary hydroxy groups, for example, by reaction with the appropriate acid anhydride or acid halide, by reaction with the appropriate ester or by reaction with the appropriate acid in the presence of an esterification catalyst, etc. Suitable acylating agents are organic carboxylic acids, particularly hydrocarbon carboxylic acids containing from 1 to 12 carbon atoms, inclusive, or acid anhydrides or acid halides thereof. Illustrative of hydrocarbon carboxylic acids employed in the formation of the acylates of the invention include saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like. If the acylating agent is the free acid, the reaction is preferably effected in the presence of an esterification catalyst, for example, p-toluenesulfonyl chloride, trifluoroacetic anhydride, p-toluenesulfonic acid, trifluoroacetic acid, sulfuric acid, and the like.

The compounds of Formula II wherein X is keto can be converted to their common carbonyl derivatives such as oximes, hydrazones, semicarbazones, cyclic alkylene ketals and the like in accordance with methods well known in the art. For example, the carbonyl group can be ketalized by reacting the selected compound with an alkanediol selected from the group of vicinal alkane-1,2-diols and alkane-1,3-diols containing up to and including 8 carbon atoms, e.g., ethylene, propylene, trimethylene, 2,3-butylene, 2,4-pentylene, 4-methyl-1,2-pentylene, 1,3-hexylene, 1,2-heptylene, 3,4-heptylene, 1,3-octylene, and the like, preferably in an organic solvent such as benzene, toluene, xylene, methylene chloride, and the like and in the presence of an acid catalyst such as p-toluenesulfonic acid. The reaction is conducted at a temperature between about 20 and about 200° C., preferably between about 40 and about 150° C. The time required for the reaction is not critical and may be varied between about 1 and 48 hours, depending on the temperature.

The acylates and the carbonyl derivatives can, if desired, be hydrolyzed in accordance with methods known in the art, e.g., with dilute acids or bases.

The following preparations and examples are intended to illustrate the process as applied to representative and typical individual organisms. The following examples are for the purpose of illustrating the best mode contemplated of carrying out the invention and to supplement the foregoing disclosure of the invention with additional descriptions of the manner and process of carrying out the invention so as further to enable workers skilled in the art to do so.

PREPARATION 1

*General procedure for the preparation of dicycloalkylamine hydrochlorides by the Leuckart reaction*

The amine was added to 98+% formic acid in a round bottom flask while cooling with tap water; the ketone was then added directly to the still warm mixture. Boiling pellets were added to control the evolution of generated carbon dioxide, and the mixture was heated at reflux for about 5 hours. Dilution with water and acidification of the cooled mixture with hydrochloric acid and extraction with several volumes of ether removed unreacted ketone. The aqueous acid solution was boiled to remove dissolved ether and then heated at reflux for 1–4 hours to hydrolyze any formates of either unreacted starting materials or products. The hydrochloride salts separated directly from the cooled mixture and were recovered by filtration.

Following the above procedures, the following amine hydrochlorides were prepared:

Cyclohexylamine (57 ml.), cyclopentanone (67 ml.), and formic acid (24 ml.) produced 50.38 g. of cyclohexylcyclopentylamine hydrochloride, M.P. 271° C.

*Analysis.*—Calcd. for $C_{11}H_{21}N \cdot HCl$ (percent): C, 64.84; H, 10.89; Cl, 17.40. Found (percent): C, 64.83; H, 11.03; Cl, 17.40.

Cyclohexylamine (112 ml.), cycloheptanone (59 ml.), and formic acid (37.7 ml.) produced 76 g. of cycloheptylcyclohexylamine hydrochloride, M.P. 264° C.

*Analysis.*—Calcd. for $C_{13}H_{25}N \cdot HCl$ (percent): C, 67.35; H, 11.31; Cl, 15.30. Found (percent): C, 66.99; H, 11.08; Cl, 15.41.

Cyclohexylamine (12 ml.), cyclooctanone (15.7 g.) and formic acid (3.75 ml.) produced 13.0 g. of cyclohexylcyclooctylamine hydrochloride, M.P. 218° C.

*Analysis.*—Calcd. for $C_{14}H_{27}N \cdot HCl$ (percent): C, 68.40; H, 11.48; N, 5.70; Cl, 14.43. Found (percent): C, 68.78; H, 11.69; N, 5.60; Cl, 14.51.

Cycloheptylamine (64 ml.), cycloheptanone (89 ml.) and formic acid (18.8 ml.) produced 80.8 g. of dicycloheptylamine hydrochloride, M.P. 230° C.

*Analysis.*—Calcd. for $C_{14}H_{27}N \cdot HCl$ (percent): C, 68.40; H, 11.48; Cl, 14.42. Found (percent): C, 68.53; H, 11.13; Cl, 14.52.

Cyclododecylamine (15.0 g.), cyclohexanone (12.75 ml.), and formic acid (3.08 ml.) produced 25.95 g. of cyclododecylcyclohexylamine hydrochloride, M.P. 268° C.

*Analysis.*—Calcd. for $C_{18}H_{35}N \cdot HCl$ (percent): C, 71.59; H, 12.02; Cl, 11.74. Found (percent): C, 72.29; H, 12.19; Cl, 11.61.

In the same manner, other dicycloalkylamine hydrochlorides, where the cycloalkyl radical contains from 5 to 15 carbon atoms, inclusive, can be prepared starting with the appropirate cycloalkylamine and cycloalkanone. The following additional conversions are representative:

cycloheptylamine+cyclopentadecanone to give cycloheptylcyclopentadecylamine hydrochloride,
cyclododecylamine+cyclodecanone to give cyclodecylcyclododecylamine hydrochloride,
cyclopentylamine+cyclopentadecanone to give cyclopentadecylcyclopentylamine hydrochloride and the like.

Following the procedure of Preparation 1, the N,N-dicycloalkylamines thus obtained can be converted to other pharmacologically acceptable salts by substituting other acids, such as hydrogen bromide, hydrogen iodide, sulfuric acid, phosphoric acid, citric acid, succinic acid, maleic acid, lactic acid and the like, in place of hydrochloric acid.

The hydrochloride and other pharmacologically acceptable acid addition salts of dicycloalkylamines wherein the cycloalkyl radicals contain from 5 to 15 carbon atoms, inclusive, for example the compounds prepared above, have cytotoxic activity and are useful for the inhibition of tumor cell contaminants on instruments in physicians' offices and hospitals. These compounds are also useful in accordance with U.S. Patents 1,915,334 and 2,075,359 in preparing amine fluosilicate mothproofing agents, and in accordance with U.S. Patents 2,425,320 and 2,606,155 in preparing amine thiocyanateformaldehyde condensation products for use as pickling inhibitors.

PREPARATION 2

*General procedure for the preparation of N-cycloalkylamides and N,N-dicycloalkylamides*

The N-cycloalkylamides and N,N-dicycloalkylamides of Formula I are prepared by cautiously reacting a cycloalkylamine or dicycloalkylamine with an acid anhydride or acid halide of a monobasic organic carboxylic acid such as those previously listed. The reaction mixture is then diluted with water and the resulting product thus obtained is recovered by conventional methods; if the product is an oil, by extraction with a suitable water-immiscible organic solvent such as methylene chloride; if the product is a solid, by filtration or centrifugation. The products thus obtained can be further purified by chromatography and/or crystallization from a suitable organic solvent such as acetone, Skellysolve B isomeric hexanes (hereinafter referred to as Skellysolve B), methylene chloride, methanol, ethanol, ether, combinations thereof and the like.

The following are illustrative:

Cyclooctylamine+acetic anhydride gave N-cyclooctylacetamide, M.P. 47–49.5° C.

Cyclodecylamine+acetic anhydride gave N-cyclodecylacetamide, M.P. 65–66° C.

*Analysis.*—Calcd. for $C_{12}H_{23}NO$ (percent): C, 73.04; H, 11.75; N, 7.10. Found (percent): C, 72.68; H, 11.04; N, 6.93.

Cyclododecylamine+acetic anhydride gave N-cyclododecylacetamide, M.P. 144–144.5° C.

*Analysis.*—Calcd. for $C_{14}H_{27}NO$ (percent): C, 74.61; H, 12.08; N, 6.22. Found (percent): C, 74.63; H, 11.96; N, 6.06.

Cyclopentadecylamine+acetic anhydride gave N-cyclopentadecylacetamide, M.P. 129–130° C.

*Analysis.*—Calcd. for $C_{17}H_{33}NO$ (percent): C, 76.35; H, 12.43; N, 5.24. Found (percent): C, 76.21; H, 12.36; N, 4.84.

Cyclohexylamine+propionic anhydride gave N-cyclohexylpropionamide, M.P. 88–90° C.

*Analysis.*—Calcd. for $C_9H_{17}NO$ (percent): C, 69.63; H, 11.04; N, 9.02. Found (percent): C, 69.55; H, 11.05; N, 8.85.

Cyclohexylamine+butyric anhydride gave N-cyclohexylbutyramide, M.P. 60–63° C.

*Analysis.*—Calcd. for $C_{10}H_{19}NO$ (precent): C, 70.96; H, 11.32; N, 8.28. Found (precent): C, 70.82; H, 11.37; N, 8.19.

Cyclododecylamine+propionyl chloride gave N-cyclododecylpropionamide, M.P. 169–170° C.

*Analysis.*—Calcd. for $C_{15}H_{29}NO$ (percent): C, 75.25; H, 12.21; N, 5.85. Found (percent): C, 75.00; H, 12.53; N, 5.65.

Cyclohexylamine+cyclopropanecarboxylic acid gave N-cyclohexylcyclopropanecarboxamide, M.P. 139–140° C.

*Analysis.*—Calcd. for $C_{10}H_{17}NO$ (percent): C, 71.81; H, 10.25; N, 8.38. Found (percent): C, 71.66; H, 10.16; N, 8.10.

Cyclohexylamine+cyclobutanecarboxylic acid chloride gave N-cyclohexylcyclobutanecarboxamide, M.P. 114–115° C.

*Analysis.*—Calcd. for $C_{11}H_{19}NO$ (percent): C, 72.88; H, 10.57; N, 7.73. Found (percent): C, 72.44; H, 10.60; N, 7.86.

Cyclohexylamine+cyclopentanecarboxylic acid chloride gave N-cyclohexylcyclopentanecarboxylamide, M.P. 157–159° C.

*Analysis.*—Calcd. for $C_{12}H_{21}NO$ (percent): C, 73.79; H, 10.84; N. 7.17. Found (percent): C, 73.58; H, 10.90; N, 7.22.

Cyclohexylamine+cyclohexanecarbonyl chloride gave N-cyclohexylcyclohexanecarbboxamide, M.P. 170–173° C.

*Analysis.*—Calcd. for $C_{13}H_{23}NO$ (percent): C, 74.59; H, 11.08; N, 6.69. Found (percent): C, 74.80; N, 11.27; N, 6.76.

Cyclohexylamine+cyclohexylacetylchloride gave N,α-dicyclohexylacetamide, M.P. 166–167° C.;

Cyclohexylamine+benzoyl chloride gave N-cyclohexylbenzamide, M.P. 149–150° C.

*Analysis.*—Calcd. for $C_{13}H_{17}NO$ (percent): C, 76.81; H, 8.43; N, 6.89. Found (percent): C, 76.40; H, 8.31; N, 6.74.

Cycloheptylamine+benzoyl chloride gave N-cycloheptylbenzamide, M.P. 132–133° C.

*Analysis.*—Calcd. For $C_{14}H_{19}NO$ (percent): C, 77.38; H, 8.81; N, 6.45. Found (percent): C, 77.33; H, 9.11; N, 6.59.

Dicyclohexylamine+benzoyl chloride gave N,N-dicyclohexylbenzamide, M.P. 92.5–100.5° C.

PREPARATION 3

N,N-dicycloalkylamides

Forty-one grams of cyclohexylcyclopentylamine hydrochloride suspended in 300 ml. of water was stirred with 100 ml. of 50% sodium hydroxide solution, and the free base was extracted with ether. The extract was washed once with water, dried over anhydrous sodium sulfate, and the solvent was removed to give the free base, which was dissolved in about 250 ml. of pyridine and treated with about 50 ml. of acetic anhydride at steam bath temperature for one hour and allowed to stand at room temperature for about 18 hours. The mixture was then stirred with about 750 ml. of water, made strongly acidic with concentrated hydrochloric acid, adjusted to pH 6 with 50% sodium hydroxide and extracted with ether. The extract was washed with dilute hydrochloric acid, dilute sodium hydroxide, water and dried over anhydrous sodium sulfate. The solvent was removed to yield 37.5 g. of N-cyclohexyl-N-cyclopentylacetamide, M.P. 53–54° C.

*Analysis.*—Calcd. for $C_{13}H_{23}NO$ (percent): C, 74.59; H, 11.07; N, 6.69. Found (percent): C, 74.70; H, 11.18; N, 6.66.

Following the procedure of Preparation 3 the following amine hydrochlorides were converted to the corresponding acetamides:

Cycloheptylcyclohexylamine hydrochloride to N-cycloheptyl-N-cyclohexylacetamide, M.P. 48–49° C.

*Analysis.*—Calcd. for $C_{15}H_{27}NO$ (percent): C, 75.89; H, 11.47; N, 5.90. Found (percent): C, 75.92; H, 11.46; N, 5.90.

Cyclohexylcyclooctylamine hydrochloride to N-cyclohexyl-N-cyclooctylacetamide as an oil. The infrared spectrum was consistent with the structure.

Cyclohexylcyclododecylamine hydrochloride to N-cyclohexyl-N-cyclododecylacetamide, M.P. 93–94° C.

*Analysis.*—Calcd. for $C_{20}H_{37}NO$ (percent): C, 78.11; H, 12.13; N, 4.56. Found (percent): C, 77.95; H, 12.14; N, 4.50.

Dicycloheptylamine hydrochloride to N,N-dicycloheptylacetamide, M.P. 63–64° C.

*Analysis.*—Calcd. for $C_{16}H_{29}NO$ (percent): C, 76.44; H, 11.63; N, 5.57. Found (percent): C, 76.19; H, 11.67; N, 5.75.

In the same manner other N,N-dicycloalkylacetamides of Formula I can be prepared from the appropriate dicycloalkylamine hydrochloride in accordance with the procedure of Preparation 3, for example, the following conversions are representative:

N-cycloheptyl-N-cyclopentadecylacetamide from cycloheptylcyclopentadecylamine hydrochloride;
N-cyclodecyl-N-cyclododecylacetamide from cyclodecylcyclododecylamine hydrochloride;
N-cyclopentadecyl-N-cyclopentylacetamide from cyclopentadecylcyclopentylamine hydrochloride,
and the like.

Other N,N-dicycloalkylamides of Formula I can be prepared in accordance with the general procedures of Preparation 3 by substituting the appropriate monobasic organic carboxylic acid anhydride or acid halide, for example, those of the acids previously listed, in place of acetic anhydride to obtain the corresponding dicycloalkylamides (I). The following products are representative:

N-cyclohexyl-N-cyclopentylpropionamide,
N-cycloheptyl-N-cyclohexylbutyramide,
N-cyclohexyl-N-cyclooctylisovaleramide,
N-cyclohexyl-N-cyclododecyltrimethylacetamide,
N,N-dicycloheptylchloroacetamide,
N-cycloheptyl-N-cyclopentadecyl-β-cyclopentylpropionamide,
N-cyclodecyl-N-cyclododecylbenzamide,
N-cyclopentadecyl-N-cyclopentylphenylacetamide, and the like.

PREPARATION 4

N-cyclohexyl-p-toluenesulfonamide

Shaking a mixture of 9.92 g. of cyclohexylamine, 18.0 g. of p-toluenesulfonyl chloride, and 100 ml. of 2 N sodium hydroxide and crystallizing the crude product from aqueous acetone gave 21.20 g. of N-cyclohexyl-p-toluenesulfonamide, M.P. 85–86° C.

*Analysis.*—Calcd. for $C_{13}H_{19}NO_2S$ (percent): C, 61.62; H, 7.56; N, 5.53; S, 12.66. Found (percent): C, 61.47; H, 7.79; N, 5.32; S, 12.89.

PREPARATION 5

N-cycloheptyl-p-toluenesulfonamide

Shaking a mixture of 25.0 ml. of cycloheptylamine, 40.0 g. of p-toluenesulfonylchloride, and 200 ml. of 2 N sodium hydroxide solution and crystallizing the crude product from methanol-water gave 48.05 g. of N-cycloheptyl-p-toluenesulfonamide, M.P. 63–64° C.

*Analysis.*—Calcd. for $C_{14}H_{21}NO_2S$ (percent): C, 62.88; H, 7.99; N, 5.24; S, 11.99. Found (percent): C, 62.46; H, 8.04; N, 5.10; S, 12.21.

PREPARATION 6

N-cyclooctyl-p-toluenesulfonamide

Shaking 12.7 g. of cyclooctylamine, 18.0 g. of p-toluenesulfonyl chloride, and 100 ml. of 2 N sodium hydroxide and crystallizing the crude product from aqueous methanol there was obtained 23.6 g. of N-cyclooctyl-p-toluenesulfonamide, M.P. 66–67° C.

*Analysis.*—Calcd. for $C_{15}H_{23}NO_2S$ (percent): N, 4.98; S, 11.38. Found (percent): N, 4.68; S, 11.49.

PREPARATION 7

N-cycloalkyl and N,N-dicycloalkylarylsulfonamides

Substituting benzene sulfonyl chloride for p-toluenesulfonyl chloride in Preparations 4–6 is productive of N-cyclohexylbenzenesulfonamide, N - cycloheptylbenzenesulfonamide and N-cyclooctylbenzenesulfonamide, respectively.

Other N-cycloalkylarylsulfonamides and N,N-dicycloalkylarylsulfonamides of Formula I are prepared by reacting the appropriate cycloalkylamine or dicycloalkylamine with the appropriate arylsulfonylhalide in accordance with the procedures of Preparations 4–6. The following conversions are representative:

cyclononylamine to N-cyclononylbenzenesulfonamide,
cyclodecylamine to N-cyclodecylamine-p-toluenesulfonamide,
cyclotridecylamine to N-cyclotridecylbenzenesulfonamide,
cyclopentadecylamine to N-cyclopentadecyl-p-toluenesulfonamide,
dicyclohexylamine to N,N-dicyclohexyl-p-toluenesulfonamide,
cyclohexylcyclopentylamine to N-cyclohexyl-N-cyclopentylbenzenesulfonamide,
cyclopentylamine to N-cyclopentyl-p-toluenesulfonamide, and
cycloheptylcyclopentadecylamine to N-cycloheptyl-N-cycylopentadecylbenzenesulfonamide.

PREPARATION 8

Benzyl cyclohexylcarbamate

A solution of 9.92 g. of cyclohexylamine in 50 ml. of pyridine was stirred and chilled to −15° C. Fifteen milliliters of carbobenzoxy chloride was added slowly over a period of about 5 minutes, and the mixture was stirred at −15° C. for 30 minutes and finally at 25° C. for 15 minutes. The mixture was diluted with 100 ml. of water, stirred, and allowed to stand for 60 hours. The resulting solid was recovered by filtration and washed with water. This material was stirred with 75 ml. of acetone and filtered. The filtrate was boiled and diluted with water to the turbidity point and then chilled to give 7.04 g. of benzyl cyclohexylcarbamate, M.P. 90–91° C.

*Analysis.*—Calcd. for $C_{14}H_{19}NO_2$ (percent): C, 72.07; H, 8.21; N, 6.01. Found (percent): C, 71.77; H, 8.05; N, 6.35.

PREPARATION 9

Benzyl cycloheptylcarbamate

A solution of 33.9 g. of cycloheptylamine in 150 ml. of pyridine was chilled and stirred in a bath at −15° C. and 56.3 g. of carbobenzoxy chloride was added over a period of about 5 minutes. The mixture was stirred at −15° C. for about 15 minutes, at 25° C. for about 30 minutes and then diluted with 350 ml. of water. Concentrated hydrochloric acid (100 ml.) was added and the mixture was extracted with ether. The ether extract was filtered, washed with dilute hydrochloric acid, water, 5% sodium bicarbonate solution, water, and dried over anhydrous sodium sulfate. The solvent was removed, and the residue was dissolved in 150 ml. of methylene chloride and chromatographed on Florisil synthetic magnesium silicate (hereinafter referred to as Florisil) and eluted with Skellysolve B containing increasing proportions of acetone from 0 to 30%. The appropriate fractions (determined by I.R.) gave 27.36 g. of benzylcycloheptylcarbamate. Recrystallization from Skellysolve B gave 19.00 g. of benzyl cycloheptylcarbamate, M.P. 56° C.

*Analysis.*—Calcd. for $C_{15}H_{21}NO_2$ (percent): C, 72.84; H, 8.56; N, 5.66. Found (percent): C, 73.43; H, 8.52; N, 5.50.

PREPARATION 10

Benzyl cyclooctylcarbamate

Following the procedure of Preparation 8, a solution of 12.06 g. of cyclooctylamine in 50 ml. of pyridine was treated with 17 ml. of carbobenzoxy chloride to give 7.45 g. of benzyl cyclooctylcarbamate as an oil, identified by infrared analysis.

In the same manner, other cycloalkylamines and dicycloalkylamines are converted to the carbamates of Formula I following the procedure of Preparations 8 and 9. The following conversions are representative:

cyclononylamine to benzyl cyclononylcarbamate,
cyclodecylamine to benzyl cyclodecylcarbamate,
cyclododecylamine to benzyl cyclododecylcarbamate,
cyclopentadecylamine to benzyl cyclopentadecylcarbamate,
dicyclohexylamine to benzyl dicyclohexylcarbamate, and
cyclohexylcyclopentylamine to benzyl cylohexylcyclopentylcarbamate.

EXAMPLE 1

Oxygenation of N-cyclododecylacetamide

N-cyclododecylacetamide was subjected to oxygenation by exposure to a growing culture of each of the species listed in Table III below.

Media

For species of the classes Phycomycetes, Ascomycetes, Basidiomycetes and Deuteromycetes the following medium was employed:

(A)
Cornsteep liquor (60% solids)—2 g.
Commercial dextrose—1 g.
Tap water—100 ml.
Lard oil—0.1 ml.
Adjusted to pH 7.

For species of the class Schizomycetes the following medium was employed:

(B)
Commercial dextrose—0.15 g.
Yeast extract—0.15 g.
Peptone—0.5 g.
Sodium chloride—0.35 g.
Tap water—100 ml.
Adjusted to pH 7.

The appropriate medium in a 250 ml. shake flask was sterilized and inoculated with about 5 ml. of a vegetative growth of the microorganism and incubated with shaking at a temperature of about 28° C. After 24 to 48 hours, or when a moderate to heavy growth of mycelium was apparent, a solution of 25 ml. of N-cyclododecylacetamide in 0.25 ml. of N,N-dimethylformamide was added to each and the incubation was continued for an additional 72-hour period. In each of the runs the oxygenated products were separated from the fermentation beer by extracting the whole beer 4 times with a volume of methylene chloride equal to about one-fourth the volume of the whole beer. The combined extracts were washed with one-fourth volume of distilled water and the solvent was removed by distillation. The residue thus obtained was assayed by paper-strip chromatography, thin-layer chromatography on silica gel, or gas chromatography, in accordance with methods known in the art, e.g., L. M. Reineke, Anal. Chem., 28, 1853–58 (1952) and Heftman, Chromatography (1961), Reinholt Publishing Co., New York, New York, and found to consist of a mixture of N-(hydroxycyclododecyl) and (oxocyclododecyl)acetamides, the major components being N-(5-, 6- and 7-hydroxycyclododecyl)acetamides and N-(5-, 6- and 7-oxocyclododecyl)acetamides.

TABLE III

*Aerobacter aerogenes*, ATCC 8724
*Absidia cylindrospora*, NRRL 2796
*Absidia cylindrospora* var. rhizomorpha, NRRL 2815
*Absidia pseudocylindrospora*, NRRL 2770
*Adelopus nudus*, CBS
*Alnicola escharoides*, CBS
*Alternaria tenuis*, ATCC 6663
*Aspergillus nidulans*, ATCC 11267
*Aspergillus versicolor*, ATCC 9577
*Chaetomium globosum*, ATCC 6205
*Cenangium abietis*, CBS
*Calonecteria decora*, CBS
*Clithris quercina*, CBS
*Cylindrocarpon radicicola*, ATCC 11011
*Cylindrocarpon didymum*, CBS
*Clavaria stricta*, CBS
*Cunninghamella blakesleeana*, ATCC 8688b
*Cunninghamella baineri*, ATCC 6794b
*Circinella angarensis*, NRRL 2410, 2628
*Cyathus poeppigii*, CBS
*Cylindrium suaveloens*, CBS
*Coprinus narcoticus*, CBS
*Curvularia lunata*, ATCC 12017
*Deconica atrorufa*, CBS
*Dermea balsamea*, CBS
*Endothia parasitica*, ATCC 9414
*Gongronella lacrispora*, NRRL 2643
*Guignardia bidwelli*, ATCC 9559
*Helminthosporium carbonum*, ATCC 9627
*Hysterium angustatum*, CBS
*Hypocrea rosellus*, ATCC 6676
*Mytilidion australe*, CBS
*Mytilidion kastenii*, CBS
*Mytilidion tortile*, CBS
*Norcardia corallina*, ATCC 4273
*Nocardia restrictus*, CBS
*Nocardia gardneri*, ATCC 9604
*Penicillium aurantiovirens*
*Pleurotus passeckerianus*, ATCC 9416
*Pholiota adiposa*, ATCC 9393
*Poria ambigua*, ATCC 9408
*Sphaeropsis visoi*, CBS
*Streptomyces mediocidicus*, ATCC 13278
*Zythia resinae*, CBS
*Septomyxa affinis*, ATCC 3737
*Penicillium atrovenetum*, CBS
*Sporotrichum sulfurescens*, ATCC 7159
*Aspergillus niger*, ATCC 9142

In the same manner, other species of Subphylum 2 of Phylum III, for example, those listed in Table II, can be substituted for those listed above and give similar results but varying ratios of hydroxy compounds of oxo compounds as well as varying amounts of the different isomeric N-(hydroxycyclododecyl)acetamides and N-(oxocyclododecyl)acetamides.

EXAMPLE 2

Oxygenation of N-cyclododecylacetamide

A medium was prepared of 20 g. of cornsteep liquor (60% solids), 10 g. of commercial dextrose and 1 l. of tap water adjusted to a pH of between 4.8 and 5.0. One ml. of lard oil was added as an antifoam preventive. Ten l. of this sterilized medium was inoculated with a 72-hour vegetative growth of *Sporotrichum sulfurescens*, ATCC 7159, and incubated at a temperature of about 28° C. with aeration at the rate of 0.5 l. per minute and stirring at 300 r.p.m. After 24 to 48 hours, or when a moderate to heavy growth of mycelium was apparent, a solution of 2.5 g. of N-cyclododecylacetamide in 25 ml. of N,N-dimethylformamide was added to the fermentation. After an additional 72-hour period of incubation, the beer and mycelium were separated by filtration. The mycelium was washed with water and the wash water was added to the beer filtrate. The beer filtrate was then extracted 4 times with a volume of methylene chloride equal to about one-fourth the volume of the whole culture. The combined extracts were washed with one-fourth volume of distilled water and the solvent was removed by distillation. The residue thus obtained, containing a mixture of N-(oxocyclododecyl)acetamides and N-(hydroxycyclododecyl)acetamides as shown by chromatographic analysis, was chromatographed on Florisil and eluted with Skellysolve B containing increasing proportions of acetone. N-(6-oxocyclododecyl)acetamide was eluted by 25% acetone-Skellysolve B and N-(7-oxocyclododecyl)acetamide by 50% acetone-Skellysolve B and by acetone. The appropriate fractions were combined and rechromatographed as above giving two crops of N-(6-oxocyclododecyl)acetamide: 5.06 g., M.P. 143–148° C. and 3.23 g., M.P. 145–147° C.; and two crops of N-(7-oxocyclododecyl)acetamide: 1.53 g., M.P. 195–197° C. and 0.50 g., M.P. 191–193° C. A sample of N-(6-oxocyclododecyl)acetamide was recrystallized from acetone for analysis, M.P. 150.5–151.5° C.

*Analysis.*—Calcd. for $C_{14}H_{25}NO_2$ (percent): C, 70.25; H, 10.53. Found (percent): C, 70.26; H, 10.49.

A sample of N-(7-oxocyclododecyl)acetamide was recrystallized from acetone for analysis, M.P. 196.5–198° C.

*Analysis.*—Calcd. for $C_{14}H_{25}NO_2$ (percent): C, 70.25; H, 10.53; N, 5.85. Found (percent): C, 69.11; H, 10.35; N, 5.71.

EXAMPLE 3

Oxygenation of N-cyclododecylacetamide

The procedures of Example 2 were repeated, using the microorganism *Rhizopus arrhizus*, ATCC 11145, and 2 g. of N-cyclododecylacetamide as the substrate to give a product shown by chromatographic analysis to be a mixture of oxygenated N-cyclododecylacetamides. This mixture was chromatographed on Florisil and eluted with Skellysolve B containing increasing proportions of acetone, giving N-(6-oxocyclododecyl)acetamide and N-(7-oxocyclododecyl)acetamide as the major components, identical to the products obtained in Example 2.

EXAMPLE 4

Oxygenation of N-cyclododecylacetamide

The bioconversion and extraction procedures of Example 2 were repeated, using the microorganism *Cyathus poeppigii*, CBS, and 3 g. of N-cyclododecylacetamide as the substrate to give a product shown by chromatographic analysis to be a mixture of oxygenated N-cyclododecylacetamides. This mixture was chromatographed on Florisil and eluted with 25 to 50% acetone-Skellysolve B giving in the earliest eluate fractions material containing N-(6-oxocyclododecyl)acetamide as the major component, followed by fractions containing increasing amounts of N-(7-oxocyclododecyl)acetamide, N-(6-hydroxycyclododecyl)acetamide and N-(7-hydroxycyclododecyl)acetamide, identical to the products obtained in Example 5.

EXAMPLE 5

Oxygenation of N-cyclododecylamine

One-hundred and twenty-five liters of sterilized medium of the same composition as used in Example 2 were inoculated with a 72-hour vegetative growth of *Sporotrichum sulfurescens*, ATCC 7159, and incubated for 19 hours at a temperature of about 28° C. using an aeration rate of 7.5 l. of air per minute with stirring at 300 r.p.m. A solution of 25 g. of N-cyclododecylamine in 250 ml. of N,N-dimethylformamide was then added to the inoculated medium and after an additional 72-hour period of incubation, the beer was filtered through Celite. The cake was washed with 12.5 l. of water and the wash was pooled with the filtered beer. The cake was discarded. The filtered beer was extracted 4 times with 30 l. portions of methylene chloride. The combined extracts were washed with 30 l. of deionized water and then concentrated at reduced pressure to about 2% of the original volume. The concentrate was allowed to dry in air and the crystalline residue thus obtained was dissolved in a minimum volume (approximately 50 ml.) of methylene chloride and chromatographed on Florisil. Elution with 25% acetone-Skellysolve B afforded N-(6-oxocyclododecyl)acetamide in the early eluate fractions and mixtures of this material with N-(7-oxocyclododecyl) acetamide in the later eluate fractions. Elution with 50% acetone-Skellysolve B afforded N-(7-oxocyclododecyl) acetamide in the early fractions and a mixture of N-(5-hydroxycyclododecyl)acetamide, N - (6 - hydroxycyclododecyl) acetamide and N-(7-hydroxycyclododecyl)acetamide in the later eluate fractions.

Recrystallization of the N-(6-oxocyclododecyl)acetamide fractions from acetone gave 3.20 g. of N-(6-oxocyclododecyl)acetamide, M.P. 143–145° C.

Recrystallization of the N-(7-oxocyclododecyl)acetamide fractions from acetone afforded 1.43 g. of N-(7-oxocyclododecyl)acetamide, M.P. 200–201° C.

The fractions containing mixed N-(hydrocyclododecyl) acetamides were recrystalized from acetone to give 0.51 g. of product, M.P. 147–155° C. The infrared spectrum showed no cycloketone absorption. Oxidation of this mixture with chromic acid gave mixtures of N-(5-oxocyclododecyl)acetamide, N-(6-oxocyclododecyl)acetamide and N-(7-oxocyclododecyl)acetamide of which N-(5-oxocyclododecyl)acetamide was the major component. The bulk of the N-(7-oxocyclododecyl)acetamide was removed by crystallization from acetone and the mother liquor was chromatographed on Florisil to give N-(5-oxocyclododecyl)acetamide in the early 20% acetone-Skellysolve B eluates. Recrystallization from acetone-Skellysolve B and then from ether gave an analytical sample of N-(5-oxocyclododecyl)acetamide, M.P. 128–129° C.

*Analysis.*—Calcd. for $C_{14}H_{25}NO_2$ (percent): C, 70.25; H, 10.53; N, 5.85. Found (percent): C, 70.60; H, 10.75; N, 6.19.

EXAMPLE 6

*Oxygenation of N-cyclododecylpropionamide*

The bioconversion and extraction procedures of Example 2 were repeated using the same microorganism, *Sporotrichum sulfurescens*, ATCC 7159, and 2 g. of N-cyclododecylpropionamide as the substrate to give a product shown by chromatographic analysis to be a mixture of oxygenated N-cyclododecylpropionamides. The mixture thus obtained was chromatographed on Florisil giving as the major component 0.11 g. of N-(6-oxocyclododecyl)propionamide, M.P. 133.5–135° C., which after 2 recrystallizations from acetone-Skellysolve B melted at 138–139° C.

*Analysis.*—Calcd. for $C_{15}H_{27}NO$ (percent): C, 71.10; H, 10.74; N, 5.53. Found (percent): C, 71.08; H, 10.56; N, 5.45.

EXAMPLE 7

*Oxygenation of N-cyclodecylacetamide*

The bioconversion and extraction procedures of Example 2 were repeated using the same microorganism, *Sporotrichum sulfurescens*, ATCC 7159, and 2 g. of N-cyclodecylacetamide as the substrate to give a product shown by chromatographic analysis to be a mixture of oxygenated N-cyclodecylacetamides. The mixture thus obtained was chromatographed on Florisil to give a mixture of N-(oxocyclodecyl)acetamides, identified by infrared spectra, of which the major components were N-(6-oxocyclodecyl)acetamide and N-(5-oxocyclodecyl)acetamide; N-(6-oxocyclodecyl)acetamide was the predominant isomer.

EXAMPLE 8

*Oxygenation of N-cyclodecylacetamide*

Following the bioconversion and extraction procedures of Example 1, N-cyclodecylacetamide was subjected to bioconversion by the microorganisms listed below. The bioconversion products thus obtained were assayed by gas chromatography and thin-layer chromatography as described in Example 1 and found to comprise a mixture of N-(oxocyclodecyl)acetamides and N-(hydroxycyclodecyl)acetamides, the major components being N-(5- and 6-hydroxycyclodecyl)acetamides and N-(5- and 6-oxocyclodecyl)acetamides.

*Cyathus poeppigii*, CBS
*Rhizopus arrhizus*, ATCC 11145
*Cunninghamella blakesleeana*, ATCC 8688a
*Deconica coprophila*, CBS
*Streptomyces roseochromogenus*, ATCC 3347

EXAMPLE 9

*Oxygenation of N-cyclopentadecylacetamide*

The bioconversion and extraction procedure of Example 2 were repeated using the microorganism *Cyathus poeppigii*, CBS, and 2 g. of N-cyclopentyldecylacetamide as the substrate to give a product shown by chromatographic analysis to be a mixture of oxygenated N-cyclopentadecylacetamides. The mixture thus obtained was chromatographed on Florisil to give about 800 mg. of a mixture of N-(oxocyclopentadecyl)acetamides, identified by infrared spectra, of which the major compent was N-(6-oxocyclopentadecyl)acetamide.

EXAMPLE 10

*Oxygenation of N-cyclopentadecylacetamide*

Following the bioconversion and extraction procedures of Example 1, N-cyclopentadecylacetamide was subjected to bioconversion by the microorganisms listed below. The bioconversion products thus obtained were assayed by gas chromatography and thin-layer chromatography as described in Example 1 and found to comprise a mixture clopentadecyl)acetamides, the major components being of N-(oxocyclopentadecyl)acetamides and N-(hydroxycyclopentadecyl)acetamides, the major components being N-(6-, 7- and 8-oxocyclopentadecyl)acetamides and N-(6-, 7- and 8-oxocyclopentadecyl)acetamides.

*Rhizopus arrhizus*, ATCC 11145
*Deconica coprophila*, CBS
*Sporotrichum sulfurescens*, ATCC 7159

EXAMPLE 11

*Oxygenation of N-cyclohexylcyclohexanecarboxamide*

The bioconversion and extraction procedures of Example 2 were repeated using the same microorganism, *Sporotrichum sulfurescens*, ATCC 7159, and 2 g. of N-cyclohexylcyclohexanecarboxamide as the substrate to give a product shown by chromatographic analysis to be a mixture of oxygenated N-cyclohexylcyclohexanecarboxamides. The mixture was dissolved in boiling acetone, filtered, and boiled down to 100 ml. volume. Cooling afforded 0.50 g. of crystalline N-(4-hydroxycyclohexyl) cyclohexanecarboxamide, M.P. 226.5–227.5° C., as the major product.

*Analysis.*—Calcd. for $C_{13}H_{23}NO_2$ (percent): C, 69.29; H, 10.29; N, 6.22. Found (percent): C, 69.63; H, 10.64; N, 6.00.

EXAMPLE 12

*Oxygenation of N-cyclohexylcyclohexanecarboxamide*

A medium was prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium phosphate, and 1 liter of tap water and adjusted to about pH 7. One ml. of lard oil was added as an antifoam preventive. 10 l. of this sterilized medium was inoculated with a 72-hour vegetative growth of *Mycobacterium rhodochrous*, ATCC 4273, and incubated for 48 hours at a temperature of about 28° C. with a rate of aeration of 0.5 l. per minute and stirring at 300 r.p.m. After 48 hours of incubation a solution of 2.5 g. of N-cyclohexylcyclohexanecarboxamide in 25 ml. of dimethylformamide was added to the fermentation. After an additional 72-hour period of incubation, the beer and mycelium were separated by filtration and extracted in the same manner as described in Example 2 to give a product shown by chromatographic analysis to be a mixture of oxygenated N-cyclohexylcyclohexanecarboxamides. The mixture thus obtained was dissolved in boiling acetone, filtered, and boiled down to 100 ml. of volume. Cooling gave the major component, crystalline N-(4-hydroxycyclohexyl)cyclohexanecarboxamide, identical to that obtained in Example 1.

EXAMPLE 13

*Oxygenation of N-cyclohexylbenzamide*

The bioconversion and extraction procedures of Example 2 were repeated using the microorganism *Sporotrichum sulfurescens*, ATCC 7159, and 2 g. of N-cyclohexylbenzamide as the substrate to give a residue shown by chromatographic analysis to be a mixture of oxygenated N-cyclohexylbenzamides. The product thus obtained was stirred with methylene chloride to give as the major component 0.46 g. of N-(4-hydroxycyclohexyl)benzamide. The filtrate was chromatographed on Florisil, giving additional N-(4-hydroxycyclohexyl)benzamide. The combined product was recrystallized from acetone-Skellysolve B to give 0.64 g. of N-(4-hydroxycyclohexyl)benzamide, M.P. 213.4–214° C.

*Analysis.*—Calcd. for $C_{13}H_{17}NO_2$ (percent): C, 71.20; H, 7.82; N, 6.39. Found (percent): C, 70.83; H, 7.91; N, 6.47.

EXAMPLE 14

*Oxygenation of N-cyclohexylbenzamide*

The procedure of Example 12 was repeated, using the same substrate but substituting the microorganism *Rhizopus arrhizus*, ATCC 11145, for *Mycobacterium rhodochrous* to give a mixture of oxygenated N-cyclohexylbenzamides of which the major component, N-(3-hydroxycyclohexyl)benzamide, was converted by oxidation with chromic acid to crystalline N-(3-oxocyclohexyl)benzamide.

EXAMPLE 15

*Oxygenation of N-cycloheptylbenzamide*

The bioconversion and extraction procedures of Example 2 were repeated using the same microorganism, *Sporotrichum sulfurescens*, ATCC 7159, and 2 g. of N-cycloheptylbenzamide as the substrate. Chromatographic analysis showed that the product thus obtained was a mixture of N-(oxocycloheptyl)benzamides and N-(hydroxycycloheptyl)benzamides. This mixture was chromatographed on Florisil and eluted with Skellysolve B containing increasing proportions of acetone, giving as the major components N-(4-oxocycloheptyl)benzamide and N-(4-hydroxycycloheptyl)benzamide. The eluates containing primarily N - (4 - hydroxycycloheptyl)benzamide were combined, evaporated to dryness, and the residue was oxidized with chromic acid. The thus obtained N-(4-oxocycloheptyl)benzamide was combined with that obtained directly from the fermentation and chromatographed on Florisil in the same manner, giving 0.98 g. of N-(4-oxocycloheptyl)benzamide which after recrystallization from acetone-Skellysolve B melted at 143–145° C. A sample of N-(4-oxocycloheptyl)benzamide, recrystallized from acetone-Skellysolve B for analysis, melted at 145–147° C.

*Analysis.*—Calcd. for $C_{14}H_{17}NO_2$ (percent): C, 72.70; H, 7.41; N, 6.06. Found (percent): C, 72.42; H, 7.61; N, 6.05.

EXAMPLE 16

*Oxygenation of N,N-dicylohexylbenzamide*

The bioconversion and extraction procedures of Example 2 were repeated on a larger scale, using 100 l. of sterilized medium of the same composition, the same microorganism, *Sporotrichum sulfurescens*, ATCC 7159, and 25 g. of N,N-dicyclohexylbenzamide as the substrate to give a residue shown by chromatographic analysis to be a mixture of oxygenated N,N-dicyclohexylbenzamides. This residue was chromatographed on Florisil and eluted with Skellysolve B containing increasing proportions of acetone to give 11 g. of the major component, N-cyclohexyl - N - (4 - hydroxycyclohexyl)benzamide, which was recrystallized from acetone-Skellysolve B to give 9.57 g., melting at 160–163° C. A sample of N-cyclohexyl-N-(4-hydroxycyclohexyl)benzamide recrystallized from the same solvents for analysis melted at 161–163° C.

*Analysis.*—Calcd. for $C_{19}H_{27}NO_2$ (percent): C, 75.71; H, 9.03; N, 4.65. Found (percent): C, 76.74; H, 10.57; N, 4.22.

Elution of the Florisil column with acetone gave 10.59 g. of crude N,N - bis - (4 - hydroxycyclohexyl)benzamide which was recrystallized from acetone-Skellysolve B to give 6.39 g. melting at 185–187° C. Several recrystallizations from the same solvent pair gave an analytical sample of N,N - bis - (4 - hydroxycyclohexyl)benzamide, M.P. 196–198° C.

*Analysis.*—Calcd. for $C_{19}H_{27}NO_3$ (percent): C, 71.89; H, 8.57; N, 4.41. Found (percent): C, 72.21; H, 8.84; N, 4.71.

EXAMPLE 17

*Oxygenation of N,N-dicyclohexylacetamide*

The bioconversion and extraction procedures of Example 5 were carried out using the same microorganism, *Sporotrichum sulfurescens*, ATCC 7159, and 25 g. of N,N-dicyclohexylacetamide as the substrate to give a product which was shown by chromatographic analysis to be a mixture of oxygenated N,N-dicyclohexylacetamides of which the major component was N-cyclohexyl-N-(4-hydroxycyclohexyl)acetamide. The mixture was dissolved in boiling acetone, filtered hot, concentrated to 225 ml. volume and then refrigerated for 2 hours. The precipitated product thus obtained was recovered by filtration, washed with 2–10 ml. portions of ice-cold acetone and recrystallized from acetone to give 7.85 g. of N-cyclohexyl - N - (4 - hydroxycyclohexyl)acetamide, M.P. 172–173.5° C.; for analysis a sample was twice recrystallized from acetone to M.P. 177–178° C.

*Analysis.*—Calcd. for $C_{14}H_{25}NO_2$ (percent): C, 70.25; H, 10.53; N, 5.85. Found (percent): C, 70.19; H, 10.27; N, 5.52.

EXAMPLE 18

*Oxygenation of N,N-dicyclohexylacetamide*

The bioconversion and extraction procedures of Example 2 were repeated using the microorganism *Calonectria decora*, CBS, and 2.5 g. of N,N-dicyclohexylacetamides as the substrate to give a product shown by chromatographic analysis to be a mixture of oxygenated N,N-dicyclohexylacetamides of which the major component was N - cyclohexyl - N - (4 - hydroxycyclohexylacetamide). The mixture was chromatographed on Florisil and eluted with Skellysolve B containing increasing proportions of acetone to give 1.14 g. of N-cyclohexyl-N-(4-hydroxycyclohexyl)acetamide, identical to the product obtained in Example 17.

EXAMPLE 19

*Oxygenation of N,N-dicyclohexylacetamide*

A medium was prepared of 50 g. of cornsteep liquor (60% solids), 200 g. of commercial lactalbumin digests (Edamine), 500 g. of commercial dextrose and 10 l. of tap water adjusted to a pH of between 4.8 and 5.0. This sterilized medium was inoculated with a 72-hour vegetative growth of *Rhizopus arrhizus,* and incubated for 24 hours at a temperature of about 28° C. with aeration at a rate of 0.5 l. per minute and stirring at 300 r.p.m. A solution of 5.0 g. of N,N-dicyclohexylacetamide in 15 ml. of N,N-dimethylformamide was then added to the fermentation. After an additional 72-hour period of incubation, oxygenated product was extracted in the same manner as disclosed in Example 1, which chromatographic analysis showed to be a mixture of the same oxygenated products as obtained in Example 17. This product was chromatographed on Florisil and eluted with Skellysolve B containing increasing proportions of acetone giving in the 25% acetone-Skellysolve B eluates N-cyclohexyl - N - (3 - hydroxycyclohexyl)acetamide. Recrystallization from acetone gave 3.24 g. of N-cyclohexyl-N-(3 - hydroxycyclohexyl)acetamide, M.P. 152–154° C. which after another recrystallization from acetone melted at 155–158° C.

*Analysis.*—Calcd. for $C_{14}H_{25}NO_2$ (percent): C, 70.25; H, 10.53; N, 5.85. Found (percent): C, 70.18; H, 10.73; N, 5.77.

EXAMPLE 20

*Oxygenation of N,N-dicycloheptylacetamide*

The bioconversion and extraction procedures of Example 2 were repeated using the same microorganism, *Sporotrichum sulfurescens,* ATCC 7159, and 2.5 g. of N,N-dicycloheptylacetamide as the substrate to give a product shown by chromatographic analysis to be a mixture of oxygenated, N,N-dicycloheptylacetamides of which the major components was N-cycloheptyl-N-(4-hydroxycycloheptyl)acetamide. The mixture was chromatographed on Florisil. Elution by the gradient method starting with Skellysolve B followed by Skellysolve B containing increasing proportions of acetone from 0 to 30% gave 0.914 g. of N-cycloheptyl-N-(4-hydroxycycloheptyl)acetamide which was oxidized with chromic acid to give 0.43 g. of N - cycloheptyl - N - (4 - oxocycloheptyl)acetamide, M.P. 99–101° C. which after treatment with activated charcoal in acetone and recrystallization from acetone-Skellysolve B melted at 106–108° C.

*Analysis.*—Calcd. for $C_{16}H_{27}NO_2$ (percent): C, 72.41; H, 10.26; N, 5.28. Found (percent): C, 72.29; H, 10.49; N, 5.51.

EXAMPLE 21

*Oxygenation of N-cyclohexyl-N-cyclopentylacetamide*

The bioconversion and extraction procedures of Example 2 were carried out on a larger scale using 100 liters of the sterilized medium of the same composition, the same microorganism, *Sporotrichum sulfurescens,* ATCC 7159, and 15 g. of N-cyclohexyl-N-cyclopentylacetamide as the substrate to give a product shown by chromatographic analysis to be a mixture of oxygenated N-cyclohexyl-N-cyclopentylacetamides of which the major component was N-cyclopentyl-N-(4-hydroxycyclohexyl)acetamide. The product thus obtained was chromatographed on Florisil and eluted by the gradient method using 10 l. of Skellysolve B containing increasing proportions of acetone from 0 to 30%. The fractions containing the desired product were combined, dissolved in methylene chloride, concentrated to a small volume and diluted with ether while concentrating until a heavy precipitate separated. The mixture was chilled and the product was isolated by filtration, washed with cold ether, and dried; the yield of N-cyclopentyl-N-(4-hydroxycyclohexyl)acetamide was 5.99 g., M.P. 144–146° C.

*Analysis.*—Calc'd for $C_{13}H_{23}NO_2$ (percent): C, 69.29; H, 10.29; N, 6.22. Found (percent): C, 69.21; H, 10.18; N, 6.37.

EXAMPLE 22

*Oxygenation of N-cycloheptyl-N-cyclohexylacetamide*

The bioconversion and extraction procedures of Example 2 were repeated using the same microorganism, *Sporotrichum sulfurescens,* ATCC 7159, and 2 g. of N-cycloheptyl-N-cyclohexylacetamide as the substrate to give a product shown by chromatographic analysis to be mixture of oxygenated N-cycloheptyl-N-cyclohexylacetamides The product thus obtained was chromatographed on Florisil and developed by the gradient method using Skellysolve B containing increasing proportions of acetone from 0 to 25%. The eluate fractions containing N-cyclohexyl - N - (4-hydroxycycloheptyl)acetamide were combined and evaporated to dryness. The oily residue thus obtained was dissolved in 25 ml. of acetone. A portion of this solution was oxidized by treating dropwise with an excess of chromic acid (Jones' reagent). After standing at room temperature for 10 minutes, the mixture was diluted with water, extracted 4 times with 30 ml. portions of methylene chloride-ether (3:1). The extract was washed once with water and dried over anhydrous sodium sulfate, and the solvent was removed to give an oil (Paper gram analysis showed this to be essentially one product with minor traces of impurities). The oil thus obtained was chromatographed on Florisil; elution with Skellysolve B containing increasing proportions of acetone gave N-cyclohexyl-N-(4-oxocycloheptyl) acetamide as an oil which crystallized on standing, M.P. 76–79° C. Recrystallization from Skellysolve B gave N-cyclohexyl-N-(4-oxocycloheptyl)acetamide M.P. 80–82° C.

*Analysis.*—Calc'd for $C_{15}H_{25}NO_2$ (percent): C, 71.67; H, 10.23; N, 5.57. Found (percent): C, 71.90; H, 10.04; N, 5.76.

The 2,4-dinitrophenylhydrazone derivative was prepared, M.P. 221–223° C.

*Analysis.*—Calc'd for $C_{21}H_{29}N_5O_5$ (percent): C, 58.45; H, 6.77; N, 16.23. Found (percent): C, 58.25; H, 6.39; N, 16.49.

EXAMPLE 23

*Bioconversion of N-cyclohexyl-N-cyclooctylacetamide*

The bioconversion and extraction procedures of Example 2 were repeated using the microorganism, *Sporotrichum sulfurescens,* ATCC 7159, and 5 g. of N-cyclohexyl-N-cyclooctylacetamide as the substrate. Paper chromatography and gas chromatography of the product showed the presence of three hydroxylated N-cyclohexyl-N-cyclooctylacetamides. Oxidation of the mixture of hydroxy compounds with chromic acid and chromatography on Florisil afforded two ketones. The less polar ketone, N-cyclohexyl - N - (5 - oxocyclooctyl)acetamire was obtained as an oil. The more polar ketone, N-cyclohexyl-N - (4-oxocyclooctyl)acetamide, was recrystallized from ether, M.P. 87–88° C.

*Analysis.*—Calc'd for $C_{16}H_{27}NO_2$ (percent): C, 72.41; H, 10.26; N, 5.28. Found (percent): C, 72.13; H, 10.51; N, 5.28.

EXAMPLE 24

*Oxygenation of benzyl cyclohexylcarbamate*

The bioconversion and extraction procedures of Example 2 were repeated using the same microorganism, *Sporotrichum sulfurescens,* ATCC 7159, and 2.0 g. of benzyl cyclohexylcarbamate as the substrate to give a product shown by chromatographic analysis to contain a mixture of oxygenated benzyl cyclohexylcarbamates of which the major component was benzyl 5-hydroxycyclohexylcarbamate. The mixture thus obtained was dissolved in 200 ml. of methylene chloride and chromatographed on 100 g. of Florisil. The column was developed with Skellysolve B containing increasing proportions of acetone from 5% to 35%. The residue from the fractions containing primarily the major component was recrystallized from acetone-Skellysolve B to yield 0.56 g. of benzyl 4-hydroxycyclohexylcarbamate, M.P. 161° C.

EXAMPLE 25

Oxygenation of benzyl cycloheptylcarbamate

The bioconversion and extraction procedures of Example 2 were repeated using the same microorganism, Sporotrichum sulfurescens, ATCC 7159, and 2.0 g. of benzyl cycloheptylcarbamate as the substrate to give a product shown by chromatographic analysis to be a mixture of oxygenated benzyl cycloheptylcarbamates. The major components of the mixture thus obtained were recovered by chromatography on Florisil. and elution with Skellysolve B containing increasing proportions of acetone. Unchanged benzyl cycloheptylcarbamate was eluted first, followed by benzyl 4-oxocycloheptylcarbamate and then by benzyl 4-hydroxycycloheptylcarbamate, both of which were obtained as oils.

EXAMPLE 26

Oxygenation of N-cyclohexyl-p-toluenesulfonamide

The bioconversion and extraction procedures of Example 2 were repeated using the same microorganism Sporotrichum sulfurescens, ATCC 7159, and 2 g. of N-cyclohexyl-p-toluenesulfonamide as the substrate to give a product shown by chromatographic analysis to be a mixture of oxygenated N-cyclohexyl-p-toluenesulfonamides of which the major component was N-(4-hydroxycyclohexyl)-p-toluenesulfonamide. The mixture thus obtaised was chromatographed on Florisil and developed with Skellysolve B containing increasing proportions of acetone from 0% to 30%. The major component, N-(4-hydroxycyclohexyl)-p-toluenesulfonamide, was eluated as an oil which was oxidized with chromic acid to give 0.627 g. of N-(4-oxocyclohexyl)-p-toluenesulfonamide, M.P. 111–112° C.; a sample crystallize from ether melted at 116–117° C.

Analysis.—Calc'd for $C_{13}H_{17}NO_3S$ (percent): C, 58.40; H, 6.41; N, 5.24; S, 12.00. Found (percent): C, 58.53; H, 6.63; N, 5.00; S, 12.06.

Example 27

Oxygenation of N-cycloheptyl-p-toluenesulfonamide

The bioconversion and extraction procedures of Example 2 were repeated using the same microorganism, Sporotrichum sulferescens, ATCC 7159, and 2 g. of N-cycloheptyl-p-toluenesulfonamide as the substrate to give a product shown by chromatographic analysis to be a mixture of N - (oxocycloheptyl) - p-toluenesulfonamides and N-(hydroxycycloheptyl)-p-toluenesulfonamides, the major components of which were oxygenated at the 4-position. The mixture thus obtained was chromatographed on Florisil and eluted by gradient elution with Skellysolve B containing increasing proportions of acetone from 0% to 30%, giving (A) 0.287 g. of N - (4 - oxocycloheptyl)-p-toluenesulfonamide (B) 0.628 g. of a mixture of N-(4-oxocycloheptyl)-p-toluenesulfonamide and N - (4 - hydroxycycloheptyl) - p-toluenesulfonamide and (C) 0.455 g. of N-(4-hydroxycycloheptyl)-p-toluenesulfonamide.

(B) and (C) were combined and oxidized with chromic acid to yield ca. 0.80 g. of N-(4-oxocycloheptyl)-p-toluenesulfonamide, which on recrystallization from ether melted at 110–112° C.

Analysis.—Calcd. for $C_{14}H_{19}NO_3S$ (percent): C, 59.75; H, 6.81; N, 4.98; S, 11.40. Found (percent): C, 59.80; H, 6.94; N, 4.80; S, 11.36.

In Examples 2 to 27, inclusive, above, other species of microorganisms of Subphylum 2 of Phylum III, for example, those species listed in Table II, can be substituted in place of the organism used in each of the said examples to give the same microbially oxygenated products in each but differing in the relative amounts of the various oxygenated products produced. The bioconversion procedure of Example 12 is preferred for species of the class Schizomycetes. The following microorganisms are representative:

Chaetomium globosum, ATCC 6205
Gloniopsis brerisaccata, CBS
Hypomyces haematococcus, CBS
Boletus luteus, CBS
Cyathus olla, CBS
Sphaerobolus stellatus, NRRL 2922
Cladosporium resinae, NRRL 2778
Brachysporium oryzae, ATCC 11571
Keratinomyces ajelloi, CBS
Rhizoctonia microsclerotia, ATTC 10187
Achlya bisexualis, ATCC 10977
Circinella spinosa, ATCC 9025
Ascochyta linicola, NRRL 2923
Mucor griseocyanus, ATCC 1207a
Micrococcus flavoreseus, ATCC 397
Corynebacterium fascians, ATCC 12974
Pseudomonas aeruginosa, ATCC 8689

In the same manner as described in Examples 1 to 27, inclusive, above, other acyl derivatives of cycloalkylamines represented by Formula I, i.e., the N-cycloalkylamides, N,N - dicycloalkylamides, aralkyl cycloalkylcarbamates and aralkyl dicycloalkylcarbamates, such as those prepared and named in Preparations 10–19, above, can likewise be microbially oxygenated using a species of Subphylum 2 of Phylum III, e.g., those listed in Table II, to give the oxygenated products of Formula II.

The following conversions using representative species and showing the major products produced are typical:

N-cyclooctylacetamide with Wojnowicia graminis, CBS, to N-(5- and 6-hydroxycyclooctyl)acetamide and N-(5- and 6-oxocyclooctyl)acetamides;

N - cyclohexylpropionamide with Gibberella saubinetii, CBS, to N-(3- and 4-hydroxycyclohexyl)propionamides and N-(3- and 4-oxocyclohexyl)propionamides;

N-cyclohexylbutyramide with Boletus sp., Peck 168 (Ohio State University) to
  N-(3- and 4-hydroxycyclohexyl)butyramides and N-(3- and 4-oxocyclohexyl)butyramides;

N - cyclohexylcyclopentanecarboxamide with Trichothecium roseum, ATCC 8685, to
  N-(3- and 4-hydroxycyclohexyl)cyclopentanecarboxamides and N-(3- and 4-oxocyclohexyl)cyclopentanecarboxamides;

N-cyclohexyl-N-cyclododecylacetamide with Micrococcus rubens, CBS, at pH 6.5–7.0, to
  N - cyclododecyl - N - (3- and 4-hydroxycyclohexyl) acetamides,
  N-cyclohexyl-N-(5-, 6- and 7-hydroxycyclododecyl) acetamides,
  N - cyclododecyl - N - (3- and 4-oxocyclohexyl)acetamides and
  N - cyclohexyl - N - (5-, 6- and 7-oxocyclodedcyl) acetamides;

N - cylooctyl-p-toluenesulfonamide with Diplodia natalensis, ATCC 9055, to
  N-(4- and 5 - hydroxycyclooctyl) - p - toluenesulfonamides and
  N-(4- and 5-oxocyclootcyl)-p-toluenesulfonamides;

N - cycloheptylcyclopentadecylbenzenesulfonamide with Glonium clavisporum, CBS, to
  N-cyclopentadecyl-N-(3- and 4-hydroxycycloheptyl) benzenesulfonamides,
  N-cycloheptyl-N-(6-, 7- and 8 - hydroxycyclopentadecyl)-benzenesulfonamides,
  N-cyclopentadecyl-N-(3- and 4-oxocycloheptyl)benzenesulfonamides and
  N-cycloheptyl-N-(6-, 7- and 8-oxocyclopentadecyl) benzenesulfonamides;

benzyl cyclooctylcarbamate with *Corticium sasaki*, CBS, to
> benzyl 5- and 6-hydroxycyclooctylcarbamates and
> benzyl 5- and 6-oxocyclooctcylcarbamates.

Example 28

*N-(4-oxocyclohexyl)cyclohexanecarboxamide*

N - (4 - hydroxycyclohexyl)cyclohexanecarboxamide (0.11 g.) from Example 11 was dissolved in acetone and oxidized with excess chromic acid to give, after recrystallization from acetone-Skellysolve B, N-(4-oxocyclohexyl)cyclohexanecarboxamide, M.P. 148–149.5° C.; the analytical sample, which after an additional recrystallization from acetone-Skellysolve B, melted at 152–154° C.

*Analysis.*—Calcd. for $C_{13}H_{21}NO_2$ (percent): C, 69.92; H, 9.48; N, 6.27. Found (percent): C, 69.37; H, 9.37; N, 6.25.

Example 29

*N-(4-oxocyclohexyl)benzamide*

N - (4-hydroxycyclohexyl)benzamide (100 mg.) from Example 12 was dissolved in 50 ml. of acetone and oxidized with excess chromic acid to give, after recrystallization from acetone-Skellysolve B, 80 mg. of N-(4-oxocyclohexyl)benzamide, M.P. 174–175° C.

*Analysis.*—Calcd. for $C_{13}H_{15}NO_2$ (percent): C, 71.86; H, 6.96; N, 6.45. Found (percent): C, 72.00; H, 6.97; N, 6.85.

Example 30

*N-cyclohexyl-N-(4-oxocyclohexyl)acetamide*

A solution of 0.20 g. of N-cyclohexyl-N-(4-hydroxycyclohexyl)-acetamide in acetone was oxidized with excess chromic acid. Following destruction of the excess oxidant with isopropyl alcohol and addition of water, the product was recovered by methylene chloride extraction. Evaporation of the extract and recrystallization of the residue from acetone-Skellysolve gave 0.13 g. of N-cyclohexyl-N-(4-oxocyclohexyl)acetamide, M.P. 142–146° C.; for analysis, a sample was recrystallized from the same solvent combination, M.P. 142–144.5° C.

*Analysis.*—Calcd. for $C_{14}H_{23}NO_2$ (percent): C, 70.85; H, 9.77; N, 5.90. Found (percent): C, 71.07; H, 9.76; N, 6.15.

Example 31

*N-cyclohexyl-N-(3-oxocyclohexyl)acetamide*

A solution of 0.30 g. of N-cyclohexyl-N-(3-hydroxycyclohexyl)acetamide in acetone was oxidized with excess chromic acid. Recrystallization of the crude product thus obtained from acetone-Skellysolve B gave 0.21 g. of N-cyclohexyl - N - (3 - oxocyclohexyl)acetamide, M.P. 114–123° C.; for analysis, a sample was recrystallized from acetone-Skellysolve B, M.P. 123–125° C.

*Analysis.*—Calcd. for $C_{14}H_{23}NO_2$ (percent); C, 70.85; H, 9.77; N, 5.90. Found (percent): C, 70.72; H, 9.82; N, 5.88.

Example 32

*N-cyclopentyl-N-(4-oxocyclohexyl)acetamide*

Two grams of N-cyclopentyl-N-(4-hydroxycyclohexyl)-acetamide dissolved in 50 ml. of acetone was treated with excess chromic acid. After 5 minutes the excess oxidant was destroyed with isopropanol and the mixture was concentrated and diluted with water. The precipitate thus obtained was recovered and crystallized from aqueous acetamide.

*Analysis.*—Calcd. for $C_{14}H_{21}NO_2$ (percent): C, 69.92; H, 9.48; N, 6.27. Found (percent): C, 70.22; H, 9.50; N, 6.55.

Example 33

*Benzyl-4-oxocyclohexylcarbamate*

Following the procedure of Example 29, above, benzyl 4-hydroxycyclohexylcarbamate was oxidized with chromic acid to give benzyl 4-oxocyclohexylcarbamate, M.P. 82–83° C.

*Analysis.*—Calcd. for $C_{14}H_{17}NO_3$ (percent): C, 67.99; H, 6.93; N, 5.67. Found (percent): C, 67.74; H, 6.86; N, 5.61.

In the same manner following the general procedure of Examples 29–33, inclusive, other hydroxycycloalkyl compounds of Formula II can likewise be oxidized to obtain the corresponding oxocycloalkyl compounds.

Example 34

*N-cyclohexyl-N-(4-oxocyclohexyl)acetamide cyclic ethylene ketal*

A solution of 2.75 g. of N-cyclohexyl-N-(4-oxocyclohexyl)acetamide in 7.0 ml. of redistilled ethylene glycol and 70 ml. of redistilled toluene was heated nearly to reflux and 70 mg. of p-toluenesulfonic and monohydrate was added. The mixture was then refluxed in an apparatus equipped with a water trap. After 2 hours of reflux an additional 4 ml. of ethylene glycol was added and reflux was continued for an additional period of about 3 hours. The cooled mixture was washed with saturated sodium bicarbonate solution and twice with water. The organic phase was separated and evaporated to dryness, giving 3.12 g. of crude product. Recrystallization from acetone-Skellysolve B gave 2.67 g. of N-cyclohexyl-N-(4-oxocyclohexyl)acetamide cyclic ethylene ketal as colorless needles, M.P. 111–113° C.

Example 35

*N-cyclohexyl-N-(3-oxocyclohexyl)acetamide cyclic ethylene ketal*

Following the procedure of Example 34, but using N-cyclohexyl-N-(3-oxocyclohexyl)acetamide in place of the 4-oxo compound produced N-cyclohexyl-N-(3-oxocyclohexyl)acetamide cyclic ethylene ketal.

In the same manner other oxocycloalkyl compounds of Formula II can likewise be converted to cyclic alkylene ketals by reacting the selected N-(oxocycloalkyl)amide, N-cycloalkyl-N-(oxocycloalkyl)amide, aralkyl oxocycloalkylcarbamate or aralkyl oxocycloalkylcycloalkylcarbamate with the appropriate alkanediol.

Example 36

*N-(6-hydroxycyclododecyl)acetamide*

N-(6-oxocyclododecyl)acetamide (7.17 g.) (.03 mole) in 250 ml. of 95% ethanol was treated with a solution of 6.0 g. of sodium borohydride in 60 ml. of 0.1 N. sodium hydroxide solution at room temperature for about 2 hours. The mixture was adjusted to pH 6 by the addition of 50% acetic acid and extracted with methylene chloride. The extract was washed with dilute hydrochloric acid, dilute sodium bicarbonate solution and water. After drying over anhydrous sodium sulfate, the solvent was evaporated to give 6.80 g. of solid N-(6-hydroxycyclododecyl)acetamide, identical to the product obtained in Example 5, above.

Example 37

*N-(7-hydroxycyclododecyl)acetamide*

Following the procedure of Example 36, 1.0 g. of N-(7-oxocyclododecyl)acetamide was reduced to 0.89 g. of N-(7-hydroxycyclododecyl)acetamide which was identical to the product obtained in Example 5.

In the same manner other oxocycloalkyl compounds of Formula II can likewise be reduced to the corresponding hydroxycycloalkyl compounds by treating the selected starting material with sodium borohydride.

EXAMPLE 38

N-(6-acetoxycyclododecyl)acetamide

Four grams of N-(6-hydroxycyclododecyl)acetamide in 40 ml. of dry pyridine was treated with 20 ml. of acetic anhydride and heated on a steam bath until the reaction was complete. The mixture was cooled, poured onto ice, stirred for ca. 1 hour and then extracted with ether. This extract was washed with dilute hydrochloric acid, dilute sodium hydroxide, water, dried over anhydrous sodium sulfate and the solvent was evaporated giving 4.65 g. of semisolid residue which was crystallized from ether-Skellysolve B to give 3.57 g. of N-(6-acetoxycyclododecyl)acetamide, M.P. 96–100° C.

Analysis.—Calcd. for $C_{16}H_{29}NO_3$ (percent): C, 67.81; H, 10.31; N, 4.94. Found (percent): C, 67.98; H, 10.48; N, 4.83.

EXAMPLE 39

N-(7-acetoxycyclododecyl)acetamide

N-(7-hydroxycyclododecyl)acetamide was acylated by the procedure of Example 38 to give 0.71 g. of N-(7-acetoxycyclododecyl)acetamide, M.P. 126–137° C.

The hydroxycycloalkyl compounds of Formula II by reaction of the selected starting material with the appropriate acid anhydride in the manner disclosed in Example 38 above, or by reaction with the appropriate acid chloride or bromide, or by reaction with the appropriate ester, or by reaction with the appropriate acid in the presence of an esterification catalyst are converted to the corresponding acyloxycycloalkyl compounds which include those wherein the acyl radical is that of an acid previously listed.

We claim:
1. A compound of the formula:

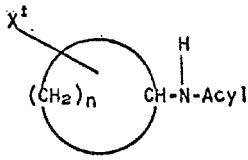

wherein $n$ is a whole number from 9 to 14, inclusive; Acyl is selected from the group consisting of the acyl radical of a monobasic hydrocarbon carboxylic acid of 1 to 12 carbon atoms, and $X^1$ is selected from the group consisting of hydroxy and keto.

2. A compound of claim 1, N-(6-oxocyclododecyl)acetamide.

3. A compound of claim 1, N-(7-oxocyclododecyl)acetamide.

4. A compound of claim 1, N-(5-oxocyclododecyl)acetamide.

5. A compound of claim 1, N-(6-oxocyclododecyl)propionamide.

6. A compound of claim 1, N-(6-hydroxycyclododecyl)acetamide.

7. A compound of claim 1, N-(7-hydroxycyclododecyl)acetamide.

References Cited

Della et al., Australian Jour. Chem. 14: 610–18 (1961).
Nelson et al., Chem. Abs. 52–5308 (1957).

ALEX MAZEL, Primary Examiner

J. A. NARCAVAGE, Assistant Examiner

U.S. Cl. X.R.

195—29, 51; 260—557, 558, 468, 556, 239.3; 424—320, 321

UNITED STATES PATENT OFFICE
CERTIFICATE OF CORRECTION

Patent No. 3,509,212            Dated July 2, 1970

Inventor(s) Gunther S. Fonken, Milton E. Herr and Herbert C. Murray

It is certified that error appears in the above-identified patent and that said Letters Patent are hereby corrected as shown below:

Column 1, lines 46 and 47, for

" 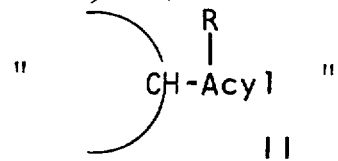 "

read

-- 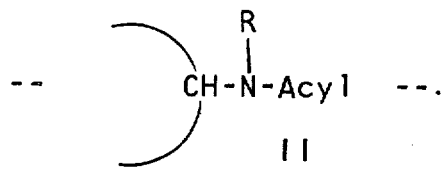 --.

Column 25, line 71, for "aqueous acetamide" read -- aqueous acetone to give N-cyclopentyl-N-(4-oxocyclohexyl)acetamide--.

SIGNED AND SEALED
SEP 29 1970

(SEAL)
Attest:

Edward M. Fletcher, Jr.
Attesting Officer

WILLIAM E. SCHUYLER, JR.
Commissioner of Patents